(12) United States Patent
Zhou et al.

(10) Patent No.: US 12,524,680 B2
(45) Date of Patent: Jan. 13, 2026

(54) CLASSIFICATION MODEL TRAINING METHOD, HYPERPARAMETER SEARCH METHOD, AND APPARATUS

(71) Applicant: Huawei Technologies Co., Ltd., Guangdong (CN)

(72) Inventors: Yucong Zhou, Shenzhen (CN); Zhao Zhong, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 545 days.

(21) Appl. No.: 18/165,083

(22) Filed: Feb. 6, 2023

(65) Prior Publication Data

US 2023/0186103 A1    Jun. 15, 2023

Related U.S. Application Data

(63) Continuation of application No. PCT/CN2021/109605, filed on Jul. 30, 2021.

(30) Foreign Application Priority Data

Aug. 7, 2020   (CN) .......................... 202010787442.0

(51) Int. Cl.
 *G06N 3/0985*   (2023.01)
 *G06N 3/084*    (2023.01)

(52) U.S. Cl.
 CPC ........... *G06N 3/0985* (2023.01); *G06N 3/084* (2013.01)

(58) Field of Classification Search
 CPC .... G06N 3/0985; G06N 3/084; G06N 3/0464; G06N 7/01; G06N 3/09; G06N 3/045; G06F 18/241
 See application file for complete search history.

(56) References Cited

U.S. PATENT DOCUMENTS

2017/0161625 A1* 6/2017 Jannson ................... G06N 7/01
2019/0355147 A1* 11/2019 Li ............................ G06N 3/09
(Continued)

FOREIGN PATENT DOCUMENTS

CN   110736707 A   1/2020
CN   111105040 A   5/2020

OTHER PUBLICATIONS

Vaccaro et al., "An Empirical Review of Automated Machine Learning," Jan. 13, 2021, Computers 2021, 10(1), 11, https://doi.org/10.3390/computers10010011 https://www.mdpi.com/2073-431X/10/1/11.*

(Continued)

*Primary Examiner* — Ryan Barrett
(74) *Attorney, Agent, or Firm* — WOMBLE BOND DICKINSON (US) LLP

(57) ABSTRACT

This application relates to the field of artificial intelligence technologies, and describes a classification model training method, a hyperparameter search method, and an apparatus. The training method includes obtaining a target hyperparameter of a to-be-trained classification model. The target hyperparameter is used to control a gradient update operation of the to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The method further includes updating the weight parameter of the to-be-trained classification model based on the target hyperparameter and a target training manner, to obtain a trained classification model.

20 Claims, 10 Drawing Sheets

(56) References Cited

U.S. PATENT DOCUMENTS

| | | | |
|---|---|---|---|
| 2021/0182077 A1* | 6/2021 | Chen | G06T 1/60 |
| 2023/0186103 A1* | 6/2023 | Zhou | G06N 3/0464 |
| | | | 706/20 |
| 2024/0111990 A1* | 4/2024 | Gale | G06N 3/0495 |
| 2024/0420326 A1* | 12/2024 | Witowski | G16H 10/60 |

OTHER PUBLICATIONS

Srinivasan et al., "A taxonomy of weight learning methods for statistical relational learning," Dec. 13, 2021, Mach Learn 111, 2799-2838 (2022), https://doi.org/10.1007/s10994-021-06069-5 https://par.nsf.gov/servlets/purl/10315168.*

Byeongho Heo et al:"AdamP: Slowing Down the Slowdown for Momentum Optimizers on Scale-invariant Weights."arXiv:2006. 08217v3 [cs.LG] Jan. 18, 2021. total 27 pages.

Byeongho Heo et al:"Slowing Down the Weight Norm Increase in Momentum-based Optimizers", Jun. 15, 2020 (Jun. 15, 2020), XP081696278, total 16 pages.

Hao Li et al: "Rethinking the Hyperparameters for Fine-tuning", Feb. 19, 2020 (Feb. 19, 2020), XP081609425, total 20 pages.

\* cited by examiner

500

| Obtain a target hyperparameter of a to-be-trained classification model, where the target hyperparameter is used to control a gradient update step of the to-be-trained classification model, the to-be-trained classification model includes a scaling invariance linear layer, and the scaling invariance linear layer enables a predicted classification result output when a weight parameter of the to-be-trained classification model is multiplied by any scaling coefficient to remain unchanged | S510 |

| Update the weight parameter of the to-be-trained classification model based on the target hyperparameter and a target training manner, to obtain a trained classification model, where according to the target training manner, a modulus length of the weight parameter of the to-be-trained classification model before update is the same as a modulus length of an updated weight parameter of the to-be-trained classification model | S520 |

Obtain candidate values of a target hyperparameter, where the target hyperparameter is used to control a gradient update step of the to-be-trained classification model, the to-be-trained classification model includes a scaling invariance linear layer, and the scaling invariance linear layer enables a predicted classification result output when a weight parameter of the to-be-trained classification model is multiplied by any scaling coefficient to remain unchanged — S610

Obtain an evaluation indicator of the to-be-trained classification model based on the candidate values and a target training manner, where according to the target training manner, a modulus length of the weight parameter of the to-be-trained classification model before update is the same as a modulus length of an updated weight parameter of the to-be-trained classification model, and the evaluation indicator includes precision of the to-be-trained classification model — S620

Determine a target value of the target hyperparameter from the candidate values based on the evaluation indicator of the to-be-trained classification model — S630

FIG. 7

CLASSIFICATION MODEL TRAINING METHOD, HYPERPARAMETER SEARCH METHOD, AND APPARATUS

CROSS-REFERENCE TO RELATED APPLICATIONS

This application is a continuation of International Application No. PCT/CN2021/109605, filed on Jul. 30, 2021, which claims priority to Chinese Patent Application No. 202010787442.0, filed on Aug. 7, 2020. The disclosures of the aforementioned applications are hereby incorporated by reference in their entireties.

TECHNICAL FIELD

This application relates to the field of artificial intelligence, and more specifically, to a classification model training method, a hyperparameter search method, and an apparatus.

BACKGROUND

Artificial intelligence (AI) is a theory, a method, a technology, or an application system that simulates, extends, and expands human intelligence by using a digital computer or a machine controlled by the digital computer, to sense an environment, obtain knowledge, and obtain an optimal result by using the knowledge. In other words, artificial intelligence is a branch of computer science, and is intended to understand the essence of intelligence and produce a new intelligent machine that can react in a manner similar to human intelligence. Artificial intelligence is to study design principles and embodiment methods of various intelligent machines, so that the machines have perception, inference, and decision-making functions. Research in the field of artificial intelligence include robotics, natural language processing, computer vision, decision-making and inference, human-computer interaction, recommendation and search, an AI basic theory, and the like.

A neural network usually includes millions or more parameter weights that can be trained. These parameters may be trained according to a series of optimization algorithms. These parameters further include some parameters that need to be determined in advance, which are referred to as hyperparameters. A hyperparameter significantly affects training effect of the neural network. An inappropriate hyperparameter usually causes non-convergence of neural network training or poor training effect. However, currently, setting of the hyperparameter usually depends on empirical data, and needs to be adjusted for a plurality of times, thereby consuming a large quantity of manpower and computing resources.

Therefore, how to effectively reduce computing resources consumed for training a classification model becomes a technical problem that urgently needs to be resolved.

SUMMARY

This application provides a classification model training method, a hyperparameter search method, and an apparatus. According to the classification model training method provided in embodiments of this application, computing resources consumed for training a classification model can be reduced while ensuring precision of the classification model.

Further, according to the hyperparameter search method provided in embodiments of this application, hyperparameter search space can be reduced, hyperparameter search efficiency can be improved, and hyperparameter search costs can be reduced.

According to a first aspect, a classification model training method is provided, including:

obtaining a target hyperparameter of a to-be-trained classification model. The target hyperparameter is used to control a gradient update operation of the to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The method further includes updating the weight parameter of the to-be-trained classification model based on the target hyperparameter and a target training manner, to obtain a trained classification model. According to the target training manner, a modulus length of the weight parameter of the to-be-trained classification model before update is the same as a modulus length of an updated weight parameter of the to-be-trained classification model.

It should be understood that when a neural network has a scaling invariance, a step size of a weight parameter of the neural network is inversely proportional to a square of a modulus length of the weight parameter. The scaling invariance means that a weight w is multiplied by any scaling coefficient, and an output y of the layer may remain unchanged. A function of a weight decay hyperparameter is mainly to constrain the modulus length of the parameter, to avoid sharp decrease of the step size with increase of the modulus length of the weight parameter. However, because weight decay is an implicit constraint, the modulus length of the weight parameter still changes with a training process. As a result, for different models, an optimal weight decay hyperparameter needs to be manually adjusted. In this embodiment of this application, according to the target training manner, that is, a displayed fixed parameter modulus length, the modulus length of the weight parameter of the to-be-trained classification model before update is the same as the modulus length of the updated weight parameter of the to-be-trained classification model. Impact of the modulus length of the weight parameter on the operation remains constant. This implements weight decay effect, and no manual adjustment is required. A prerequisite for using the target training manner is that the neural network needs to have the scaling invariance. Generally, for most neural networks, most layers have the scaling invariance, but most classification layers in a classification model are scaling sensitive. Therefore, in this embodiment of this application, the scaling invariance linear layer is used to replace an original classification layer, so that each layer of the to-be-trained classification model has the scaling invariance.

In this embodiment of this application, the classification layer of the to-be-trained classification model is replaced with the scaling invariance linear layer, and the modulus lengths of the weight parameters before and after the update of the to-be-trained classification model are fixed by using the target training manner, so that two important hyperparameters, that is, a learning rate and the weight decay, can be equivalently replaced with target hyperparameters during training of the to-be-classified model. Therefore, when the to-be-trained classification model is trained, only the target hyperparameter of the to-be-trained model needs to be configured, so that computing resources consumed for training the to-be-trained classification model can be reduced.

In a possible embodiment, the classification model may include any neural network model having a classification function. For example, the classification model may include but is not limited to a detection model, a segmentation model, a recognition model, and the like.

In a possible embodiment, the target hyperparameter may be an equivalent learning rate. A function of the equivalent learning rate in the to-be-trained classification model may be considered as the same as or similar to a function of the learning rate. The equivalent learning rate is used to control the gradient update operation of the to-be-trained classification model.

With reference to the first aspect, in some embodiments of the first aspect, the weight parameter of the trained classification model is obtained through a plurality of iterative updates by using a backpropagation algorithm and based on the target hyperparameter and the target training manner.

With reference to the first aspect, in some embodiments of the first aspect, the scaling invariance linear layer obtains the predicted classification result according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

It should be noted that the foregoing formula is used as an example to describe the scaling invariance processing. An objective of the scaling invariance linear layer is to multiply the weight w by the any scaling coefficient, and the output y of the layer may remain unchanged. In other words, the scaling invariance processing may alternatively be performed in another specific processing manner. This is not limited in this application.

With reference to the first aspect, in some embodiments of the first aspect, the target training manner includes:
processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

According to a second aspect, a hyperparameter search method is provided, including:
obtaining candidate values of a target hyperparameter. The target hyperparameter is used to control a gradient update operation of a to-be-trained classification model. The to-be-trained classification model includes a scaling invariance linear layer. The scaling invariance linear layer is configured to enable a predicted classification result output when a weight parameter of the to-be-trained classification model is multiplied by any scaling coefficient to remain unchanged.

The method further includes obtaining a performance parameter of the to-be-trained classification model based on the candidate values and a target training manner. According to the target training manner, a modulus length of the weight parameter of the to-be-trained classification model before update is the same as a modulus length of an updated weight parameter of the to-be-trained classification model. The performance parameter includes precision of the to-be-trained classification model.

The method further includes determining a target value of the target hyperparameter from the candidate values based on the performance parameter.

It should be noted that, in this embodiment of this application, a classification layer in the to-be-trained classification model may be replaced with the scaling invariance linear layer, so that each layer in the to-be-classified training model has scaling invariance, that is, scaling insensitivity.

It should be understood that, in this embodiment of this application, two important hyperparameters, that is, a learning rate and weight decay, included in the to-be-trained classification model may be equivalently replaced with the target hyperparameter by using the target training manner. Because according to the target training manner, the modulus length of the weight parameter of the to-be-trained classification model before update is the same as the modulus length of the updated weight parameter of the to-be-trained classification model, when the weight parameter of the to-be-trained classification model is updated, only the target hyperparameter needs to be searched for, to determine the target value of the target hyperparameter. The target hyperparameter may be an equivalent learning rate. A function of the equivalent learning rate in the to-be-trained classification model may be considered as the same as or similar to a function of the learning rate. The equivalent learning rate is used to control the gradient update operation of the to-be-trained classification model.

In this embodiment of this application, the classification layer in the to-be-trained classification model may be replaced with the scaling invariance linear layer in the to-be-trained classification model, so that each layer of the to-be-trained classification model has the scaling invariance. Further, the target training manner is used, so that optimal precision that can be achieved by adjusting the two hyperparameters (the learning rate and the weight decay) in normal training can be achieved by adjusting only one target hyperparameter. In other words, a search process of the two hyperparameters is equivalently replaced with a search process of the one target hyperparameter, to reduce a search dimension of the hyperparameter, improve search efficiency of the target hyperparameter, and reduce search costs of the hyperparameter.

With reference to the second aspect, in some embodiments of the second aspect, precision of the to-be-trained classification model corresponding to the target value is greater than precision of the to-be-trained classification model corresponding to another candidate value in the candidate values.

In this embodiment of this application, the target value of the target hyperparameter may be a corresponding candidate value that enables model precision of the to-be-trained classification model to reach optimal precision in the candidate values of the target hyperparameter that are allocated to the to-be-trained classification model.

With reference to the second aspect, in some embodiments of the second aspect, the obtaining candidate values of a target hyperparameter includes:

evenly dividing an initial search range of the target hyperparameter to obtain the candidate values of the target hyperparameter.

In this embodiment of this application, the candidate values of the target hyperparameter may be a plurality of candidate values of the target hyperparameter obtained by evenly dividing the initial search range set by a user.

In a possible embodiment, in addition to the foregoing evenly dividing the initial search range to obtain the plurality of candidate values, the initial search range may also be divided in another manner.

With reference to the second aspect, in some embodiments of the second aspect, the method further includes:

updating the initial search range of the target hyperparameter based on a current quantity of training operations, a preconfigured quantity of training operations, and a change trend of precision of the to-be-trained classification model.

In a possible embodiment, the initial search range of the target hyperparameter is updated based on the current quantity of training operations, the preconfigured quantity of training operations, and monotonicity of the precision of the to-be-trained classification model.

In this embodiment of this application, to quickly find the target value of the target hyperparameter, that is, the optimal target hyperparameter, when searching for the target hyperparameter, the initial search range of the target hyperparameter may be updated based on monotonicity of the performance parameter of the to-be-trained classification model, to narrow a search range of the target hyperparameter and improve search efficiency of the target hyperparameter.

With reference to the second aspect, in some embodiments of the second aspect, the updating the initial search range of the target hyperparameter based on a current quantity of training operations, a preconfigured quantity of training operations, and a change trend of precision of the to-be-trained classification model includes:

if the current quantity of training operations is less than the preconfigured quantity of training operations, updating an upper limit of the initial search range of the target hyperparameter to a candidate value of the target hyperparameter corresponding to optimal precision of the to-be-trained classification model in the current quantity of training operations.

With reference to the second aspect, in some embodiments of the second aspect, the updating the initial search range of the target hyperparameter based on a current quantity of training operations, a preconfigured quantity of training operations, and a change trend of precision of the to-be-trained classification model includes:

if the current quantity of training operations is equal to the preconfigured quantity of training operations, updating an upper limit of the initial search range of the target hyperparameter to a first candidate value, and updating a lower limit of a search range of the target hyperparameter to a second candidate value. The first candidate value and the second candidate value are candidate values adjacent to a candidate value of the target hyperparameter corresponding to optimal precision of the to-be-trained classification model.

With reference to the second aspect, in some embodiments of the second aspect, the scaling invariance linear layer obtains the predicted classification result according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, $X$ represents a to-be-classified feature, and $S$ represents a scale constant.

With reference to the second aspect, in some embodiments of the second aspect, the target training manner includes:

processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

In this embodiment of this application, when each layer of the to-be-trained classification model has the scaling invariance, the weight of the to-be-trained classification model is iteratively updated by using the target training manner, so that the modulus length of the weight parameter before update is the same as the modulus length of the updated weight parameter. In other words, weight decay effect can be implemented by using the target training manner, and manual adjustment is not required.

According to a third aspect, a classification model training apparatus is provided, including:

an obtaining unit, configured to obtain a target hyperparameter of a to-be-trained classification model. The target hyperparameter is used to control a gradient update operation of the to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The apparatus further includes a processing unit, configured to update the weight parameter of the to-be-trained classification model based on the target hyperparameter and a target training manner, to obtain a trained classification model. According to the target training manner, a modulus length of the weight parameter of the to-be-trained classification model before update is the same as a modulus length of an updated weight parameter of the to-be-trained classification model.

With reference to the third aspect, in some embodiments of the third aspect, the weight parameter of the trained classification model is obtained through a plurality of iterative updates by using a backpropagation algorithm and based on the target hyperparameter and the target training manner.

With reference to the third aspect, in some embodiments of the third aspect, the scaling invariance linear layer obtains the predicted classification result according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

With reference to the third aspect, in some embodiments of the third aspect, the target training manner includes:
processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

According to a fourth aspect, a hyperparameter searching apparatus is provided, including:
an obtaining unit, configured to obtain candidate values of a target hyperparameter. The target hyperparameter is used to control a gradient update operation of a to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The apparatus further includes a processing unit, configured to obtain a performance parameter of the to-be-trained classification model based on the candidate values and a target training manner. According to the target training manner, a modulus length of the weight parameter of the to-be-trained classification model before update is the same as a modulus length of an updated weight parameter of the to-be-trained classification model. The performance parameter includes precision of the to-be-trained classification model. The processing unit is further configured to determine a target value of the target hyperparameter from the candidate values based on the performance parameter.

It should be noted that, in this embodiment of this application, a classification layer in the to-be-trained classification model may be replaced with the scaling invariance linear layer, so that each layer in the to-be-classified training model has scaling invariance, that is, scaling insensitivity.

It should be understood that, in this embodiment of this application, two important hyperparameters, that is, a learning rate and weight decay, included in the to-be-trained classification model may be equivalently replaced with the target hyperparameter by using the target training manner. Because according to the target training manner, the modulus length of the weight parameter of the to-be-trained classification model before update is the same as the modulus length of the updated weight parameter of the to-be-trained classification model, when the weight parameter of the to-be-trained classification model is updated, only the target hyperparameter needs to be searched for, to determine the target value of the target hyperparameter. The target hyperparameter may be an equivalent learning rate. A function of the equivalent learning rate in the to-be-trained classification model may be considered as the same as or similar to a function of the learning rate. The equivalent learning rate is used to control the gradient update operation of the to-be-trained classification model.

In this embodiment of this application, the classification layer in the to-be-trained classification model may be replaced with the scaling invariance linear layer in the to-be-trained classification model, so that each layer of the to-be-trained classification model has the scaling invariance. Further, the target training manner is used, so that optimal precision that can be achieved by adjusting the two hyperparameters (the learning rate and the weight decay) in normal training can be achieved by adjusting only one target hyperparameter. In other words, a search process of the two hyperparameters is equivalently replaced with a search process of the one target hyperparameter, to reduce a search dimension of the hyperparameter, improve search efficiency of the target hyperparameter, and reduce search costs of the hyperparameter.

With reference to the fourth aspect, in some embodiments of the fourth aspect, precision of the to-be-trained classification model corresponding to the target value is greater than precision of the to-be-trained classification model corresponding to another candidate value in the candidate values.

In this embodiment of this application, the target value of the target hyperparameter may be a corresponding candidate value that enables model precision of the to-be-trained classification model to reach optimal precision in the candidate values of the target hyperparameter that are allocated to the to-be-trained classification model.

With reference to the fourth aspect, in some embodiments of the fourth aspect, the processing unit is specifically configured to:
evenly divide an initial search range of the target hyperparameter to obtain the candidate values of the target hyperparameter.

In this embodiment of this application, the candidate values of the target hyperparameter may be a plurality of candidate values of the target hyperparameter obtained by evenly dividing the initial search range set by a user.

With reference to the fourth aspect, in some embodiments of the fourth aspect, the processing unit is further configured to:
update the initial search range of the target hyperparameter based on a current quantity of training operations, a preconfigured quantity of training operations, and a change trend of precision of the to-be-trained classification model.

In this embodiment of this application, to quickly find the target value of the target hyperparameter, that is, the optimal target hyperparameter, when searching for the target hyperparameter, the initial search range of the target hyperparameter may be updated based on monotonicity of the performance parameter of the to-be-trained classification model, to narrow a search range of the target hyperparameter and improve search efficiency of the target hyperparameter.

With reference to the fourth aspect, in some embodiments of the fourth aspect, the processing unit is specifically configured to:
if the current quantity of training operations is less than the preconfigured quantity of training operations, update an upper limit of the initial search range of the target hyperparameter to a candidate value of the target hyperparameter corresponding to optimal precision of the to-be-trained classification model in the current quantity of training operations.

With reference to the fourth aspect, in some embodiments of the fourth aspect, the processing unit is specifically configured to:

if the current quantity of training operations is equal to the preconfigured quantity of training operations, update an upper limit of the initial search range of the target hyperparameter to a first candidate value, and update a lower limit of a search range of the target hyperparameter to a second candidate value. The first candidate value and the second candidate value are candidate values adjacent to a candidate value of the target hyperparameter corresponding to optimal precision of the to-be-trained classification model.

With reference to the fourth aspect, in some embodiments of the fourth aspect, the scaling invariance linear layer obtains the predicted classification result according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, $X$ represents a to-be-classified feature, and $S$ represents a scale constant.

With reference to the fourth aspect, in some embodiments of the fourth aspect, the target training manner includes:

processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

In this embodiment of this application, when each layer of the to-be-trained classification model has the scaling invariance, the weight of the to-be-trained classification model is iteratively updated by using the target training manner, so that the modulus length of the weight parameter before update is the same as the modulus length of the updated weight parameter. In other words, weight decay effect can be implemented by using the target training manner, and manual adjustment is not required.

According to a fifth aspect, a classification model training method is provided, including a memory, configured to store a program; and a processor, configured to execute the program stored in the memory. When the program stored in the memory is executed by the processor, the processor is configured to: obtaining a target hyperparameter of a to-be-trained classification model. The target hyperparameter is used to control a gradient update operation of the to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The method further includes updating the weight parameter of the to-be-trained classification model based on the target hyperparameter and a target training manner, to obtain a trained classification model. According to the target training manner, a modulus length of the weight parameter of the to-be-trained classification model before update is the same as a modulus length of an updated weight parameter of the to-be-trained classification model.

In a possible embodiment, the processor included in the searching apparatus is further configured to perform the training method in any embodiment of the first aspect.

It should be understood that an extension, a limitation, an explanation, and a description of related content in the first aspect are also applicable to same content in the third aspect.

According to a sixth aspect, a hyperparameter searching apparatus is provided, including a memory, configured to store a program; and a processor, configured to execute the program stored in the memory. When the program stored in the memory is executed by the processor, the processor is configured to: obtain candidate values of a target hyperparameter. The target hyperparameter is used to control a gradient update operation of a to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The processor is further configured to obtain a performance parameter of the to-be-trained classification model based on the candidate values and a target training manner. According to the target training manner, a modulus length of the weight parameter of the to-be-trained classification model before update is the same as a modulus length of an updated weight parameter of the to-be-trained classification model. The performance parameter includes precision of the to-be-trained classification model. The processor is further configured to determine a target value of the target hyperparameter from the candidate values based on the performance parameter.

In a possible embodiment, the processor included in the searching apparatus is further configured to perform the search method in any embodiment of the second aspect.

It should be understood that an extension, a limitation, an explanation, and a description of related content in the second aspect are also applicable to same content in the third aspect.

According to a seventh aspect, a computer-readable medium is provided. The computer-readable medium stores program code to be executed by a device, and the program code includes the training method according to any one of the first aspect and the embodiments of the first aspect.

According to an eighth aspect, a computer-readable medium is provided. The computer-readable medium stores program code to be executed by a device, and the program code includes the search method according to any one of the second aspect and the embodiments of the second aspect.

According to a ninth aspect, a computer-readable medium is provided. The computer-readable medium stores program code to be executed by a device, and the program code includes the training method according to any one of the first aspect and the embodiments of the first aspect.

According to a tenth aspect, a computer program product including instructions is provided. When the computer program product runs on a computer, the computer is enabled to perform the search method according to any one of the second aspect and the embodiments of the second aspect According to an eleventh aspect, a chip is provided. The chip includes a processor and a data interface, and the processor reads, by using the data interface, instructions stored in a memory, to perform the training method according to any one of the first aspect or the embodiments of the first aspect.

In an embodiment, the chip may further include the memory. The memory stores the instructions. The processor is configured to execute the instructions stored in the memory. When the instructions are executed, the processor is configured to execute the training method according to any one of the first aspect and the embodiments of the first aspect.

According to a twelfth aspect, a chip is provided. The chip includes a processor and a data interface, and the processor reads, by using the data interface, instructions stored in a memory, to perform the search method according to any one of the second aspect or the embodiments of the second aspect.

In an embodiment, the chip may further include the memory. The memory stores the instructions. The processor is configured to execute the instructions stored in the memory. When the instructions are executed, the processor is configured to execute the search method according to any one of the second aspect and the embodiments of the second aspect.

BRIEF DESCRIPTION OF DRAWINGS

FIG. 5 is a schematic flowchart of a classification model training method according to an embodiment of this application;

FIG. 7 is a schematic flowchart of a hyperparameter search method according to an embodiment of this application;

DESCRIPTION OF EMBODIMENTS

The following describes the technical solutions in embodiments of this application with reference to the accompanying drawings in embodiments of this application. Clearly, the described embodiments are merely some rather than all of embodiments of this application.

First, concepts involved in embodiments of this application are briefly described.

1. Hyperparameter

In machine learning, a hyperparameter is a parameter whose value is set before a learning process starts, but not parameter data obtained through training. Generally, hyperparameter may be optimized, so that a group of optimal hyperparameters can be selected for a learning machine, to improve learning performance and effect.

2. Learning Rate

A learning rate is an important hyperparameter during neural network training. The learning rate may be used to control a gradient update operation in a neural network training process.

3. Weight Decay

Weight decay is an important hyperparameter for training a neural network. The weight decay can be used to control constraint strength of the weight.

Figure 1:
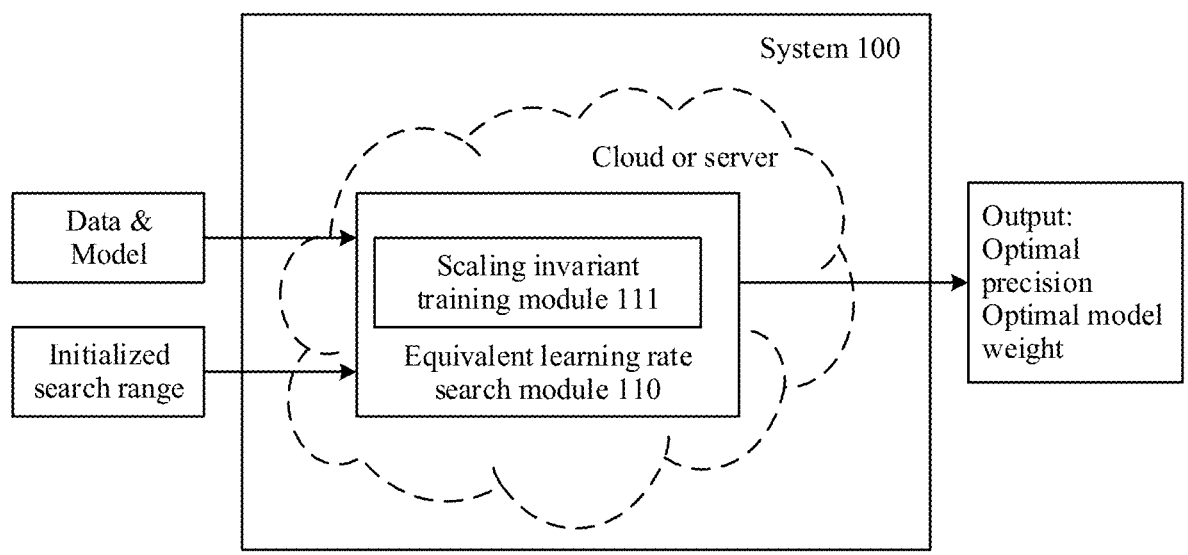
FIG. 1 is a schematic diagram of a system architecture of a hyperparameter search method according to an embodiment of this application.

The following describes a system architecture of a hyperparameter search method in an embodiment of this application with reference to FIG. 1.

As shown in FIG. 1, a system architecture 100 may include an equivalent learning rate search module 110 and a scaling invariant training module 111. The equivalent learning rate search module 110 is configured to optimize a hyperparameter of a neural network model, to obtain optimal precision corresponding to the neural network model and an optimal model weight corresponding to the optimal precision. The scaling invariant training module 111 is configured to perform iterative update on a weight of the neural network model based on different input equivalent learning rate hyperparameters, to obtain a parameter of the neural network model.

It should be noted that the equivalent learning rate hyperparameter may be used to control a gradient update operation in a neural network training process. Only the equivalent learning rate hyperparameter is adjusted in the neural network, so that the neural network model can achieve optimal model precision that can be achieved by adjusting the two hyperparameters, that is, a learning rate and weight decay, during normal training.

For example, as shown in FIG. 1, the equivalent learning rate search module 110 and the scaling invariant training module 111 may be deployed on a cloud or a server.

Figure 2:
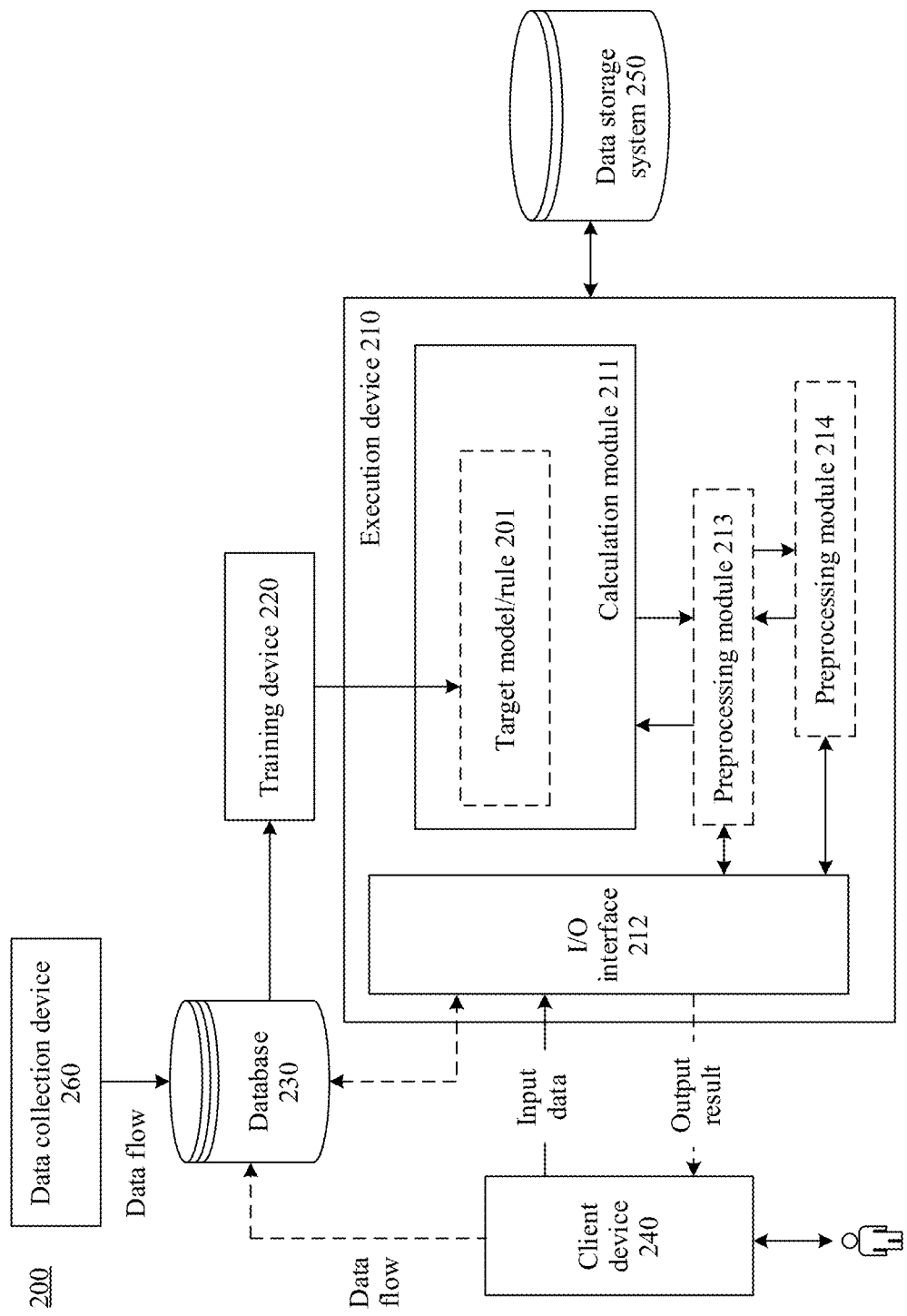
FIG. 2 is a schematic diagram of a system architecture according to an embodiment of this application.

FIG. 2 shows a system architecture 200 according to an embodiment of this application.

In FIG. 2, a data collection device 260 is configured to collect training data. For a to-be-trained classification model in this embodiment of this application, the to-be-trained classification model may be trained by using training data collected by the data collection device 260.

For example, in this embodiment of this application, for the to-be-trained classification model, the training data may include to-be-classified data and a sample label corresponding to the to-be-classified data.

After collecting the training data, the data collection device 260 stores the training data in a database 230. A training device 220 obtains a target model/rule 201 through training based on the training data maintained in the database 230.

The following describes how the training device 220 obtains the target model/rule 201 based on the training data.

For example, the training device 220 processes input training data of the to-be-trained classification model, and compares a predicted classification result corresponding to the to-be-classified data output by the to-be-trained classification model with a truth value corresponding to the to-be-classified data, until a difference between the predicted classification result output by the training device 220 and the truth value is less than a specific threshold, to complete training of the classification model.

It should be noted that, during actual application, the training data maintained in the database 230 is not necessarily all collected by the data collection device 260, and may be received from another device.

It should be further noted that the training device 220 may not necessarily train the target model/rule 201 completely based on the training data maintained in the database 230, or may obtain training data from a cloud or another place to perform model training. The foregoing description should not be construed as a limitation on embodiments of this application.

The target model/rule 201 obtained through training by the training device 220 may be used on different systems or devices, for example, an execution device 210 shown in FIG. 2. The execution device 210 may be a terminal, for example, a mobile phone terminal, a tablet computer, a laptop computer, an augmented reality (AR)/virtual reality (VR) terminal, or a vehicle-mounted terminal, or may be a server, a cloud, or the like. In FIG. 2, the execution device 210 configures an input/output (I/O) interface 212, configured to exchange data with an external device. A user may input data to the I/O interface 212 by using a client device 240. The input data in this embodiment of this application may include training data input by the client device.

A preprocessing module 213 and/or a preprocessing module 214 are/is configured to perform preprocessing based on the input data received by the I/O interface 212. In this embodiment of this application, there may alternatively be no preprocessing module 213 and no preprocessing module 214 (or there may be only one of the preprocessing modules), and the input data is processed directly by using a calculation module 211.

In a process in which the execution device 210 performs preprocessing on the input data or the calculation module 211 of the execution device 210 performs related processing such as calculation, the execution device 210 may invoke data, code, and the like in a data storage system 250 for corresponding processing, and may also store data, instructions, and the like obtained through corresponding processing into the data storage system 250.

Finally, the I/O interface 212 returns a processing result, for example, a target value of a target hyperparameter, to a client device 240, to provide the processing result to the user.

It should be noted that the training device 220 may generate corresponding target models/rules 201 for different targets or different tasks based on different training data. The corresponding target models/rules 201 may be used to implement the foregoing targets or complete the foregoing tasks, to provide a required result for the user.

In a case shown in FIG. 2, the user may manually provide the input data in a user interface provided by the I/O interface 212.

In another case, the client device 240 may automatically send the input data to the I/O interface 212. If the client device 240 needs to obtain authorization from the user to automatically send the input data, the user may set corresponding permission on the client device 240. The user may view, on the client device 240, a result output by the execution device 210, and a specific presentation form may be a specific manner, for example, displaying, a sound, or an action. The client device 240 may also serve as a data collector to collect, as new sample data, the input data that is input into the I/O interface 212 and the output result that is output from the I/O interface 212 that are shown in the figure, and store the new sample data into the database 230. Certainly, the client device 240 may alternatively not perform collection, but the I/O interface 212 directly stores, as new sample data into the database 230, the input data that is input into the I/O interface 212 and the output result that is output from the I/O interface 212 that are shown in the figure.

It should be noted that FIG. 2 is merely the schematic diagram of the system architecture provided in this embodiment of this application. A location relationship between devices, components, modules, and the like shown in the figure does not constitute any limitation. For example, in FIG. 2, the data storage system 250 is an external memory relative to the execution device 210. In another case, the data storage system 250 may alternatively be disposed in the execution device 210.

Figure 3:
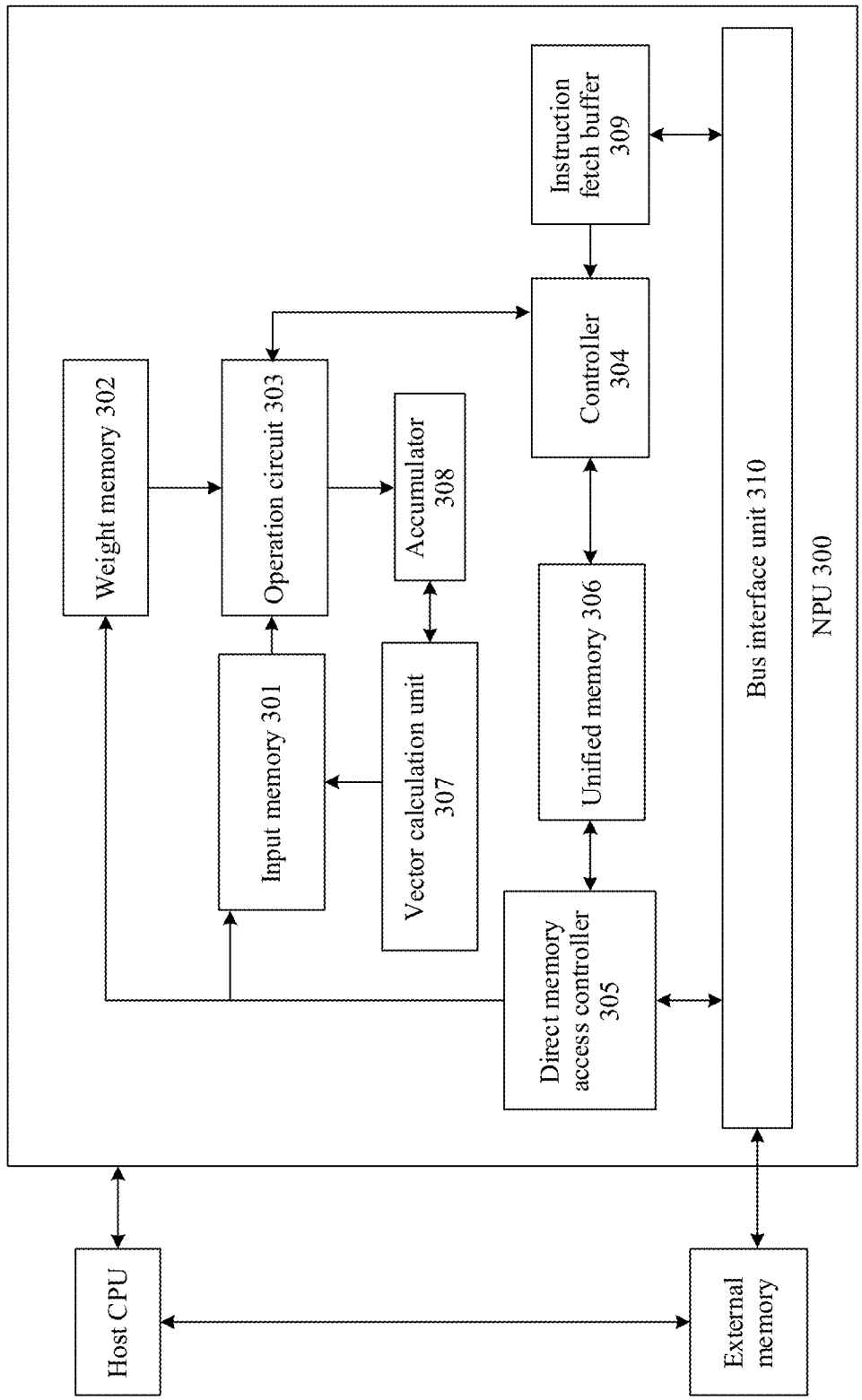
FIG. 3 is a schematic diagram of a hardware structure of a chip according to an embodiment of this application.

FIG. 3 is a schematic diagram of a hardware structure of a chip according to an embodiment of this application.

The chip shown in FIG. 3 may include a neural network processor 300 (NPU). The chip may be disposed in the execution device 210 shown in FIG. 2, to complete calculation of the calculation module 211. Alternatively, the chip may be disposed in the training device 220 shown in FIG. 2, to complete the training work of the training device 220 and output the target model/rule 201.

The NPU 300 is mounted to a host central processing unit (CPU) as a coprocessor, and the host CPU allocates a task. A core part of the NPU 300 is an operation circuit 303, and a controller 304 controls the operation circuit 303 to extract data in a memory (a weight memory or an input memory) and perform an operation.

In some embodiments, the operation circuit 303 internally includes a plurality of processing units (PE). In some embodiments, the operation circuit 303 is a two-dimensional systolic array. Alternatively, the operation circuit 303 may be a one-dimensional systolic array or another electronic circuit that can perform mathematical operations such as multiplication and addition. In some embodiments, the operation circuit 303 is a general-purpose matrix processor.

For example, it is assumed that there is an input matrix A, a weight matrix B, and an output matrix C. The operation circuit 303 obtains corresponding data of the matrix B from the weight memory 302, and buffers the data on each PE in the operation circuit 303. The operation circuit 303 obtains data of the matrix A from the input memory 301 to perform a matrix operation with that of the matrix B, and stores a partial result or a final result of an obtained matrix into an accumulator 308.

A vector calculation unit 307 may perform further processing such as vector multiplication, vector addition, an exponent operation, a logarithmic operation, or value comparison on output of the operation circuit 303. For example, the vector calculation unit 307 may be configured to perform network calculation, such as pooling, batch normalization, or local response normalization, at a non-convolution/non-fully connected (FC) layer of a neural network.

In some embodiments, the vector calculation unit 307 can store a processed output vector in the unified memory 306. For example, the vector calculation unit 307 may apply a non-linear function to the output, for example, a vector of an accumulated value, of the operation circuit 303 to generate an activation value. In some embodiments, the vector calculation unit 307 generates a normalized value, a combined value, or both.

In some embodiments, the processed output vector can be used as an activation input for the operation circuit 303, for example, can be used at a subsequent layer of the neural network.

The unified memory 306 is configured to store input data and output data. Weight data is directly transferred to the weight memory 302 by using a direct memory access controller (DMAC) 305, input data in an external memory is stored in the input memory 301 and/or the unified memory 306, weight data in the external memory is stored in the weight memory 302, and the data in the unified memory 306 is stored in the external memory.

A bus interface unit 310 (BIU) is configured to implement interaction between the host CPU, the DMAC, and an instruction fetch buffer 309 through a bus.

The instruction fetch buffer 309 connected to the controller 304 is configured to store instructions used by the controller 304. The controller 304 is configured to invoke the instructions buffered in the instruction fetch buffer 309, to control a working process of the operation accelerator.

Generally, the unified memory 306, the input memory 301, the weight memory 302, and the instruction fetch buffer 309 each are an on-chip memory. The external memory is a memory outside the NPU. The external memory may be a double data rate synchronous dynamic random access memory (DDR SDRAM), a high bandwidth memory (HBM), or another readable and writable memory.

For example, in this embodiment of this application, a related operation of iterative update of the weight parameter of the to-be-trained classification model may be performed by the operation circuit 303 or the vector calculation unit 307.

The execution device 210 in FIG. 2 described above can perform the operations of the hyperparameter search method in embodiments of this application, and the chip shown in 3 may also be configured to perform the operations of the hyperparameter search method in embodiments of this application.

Figure 4:
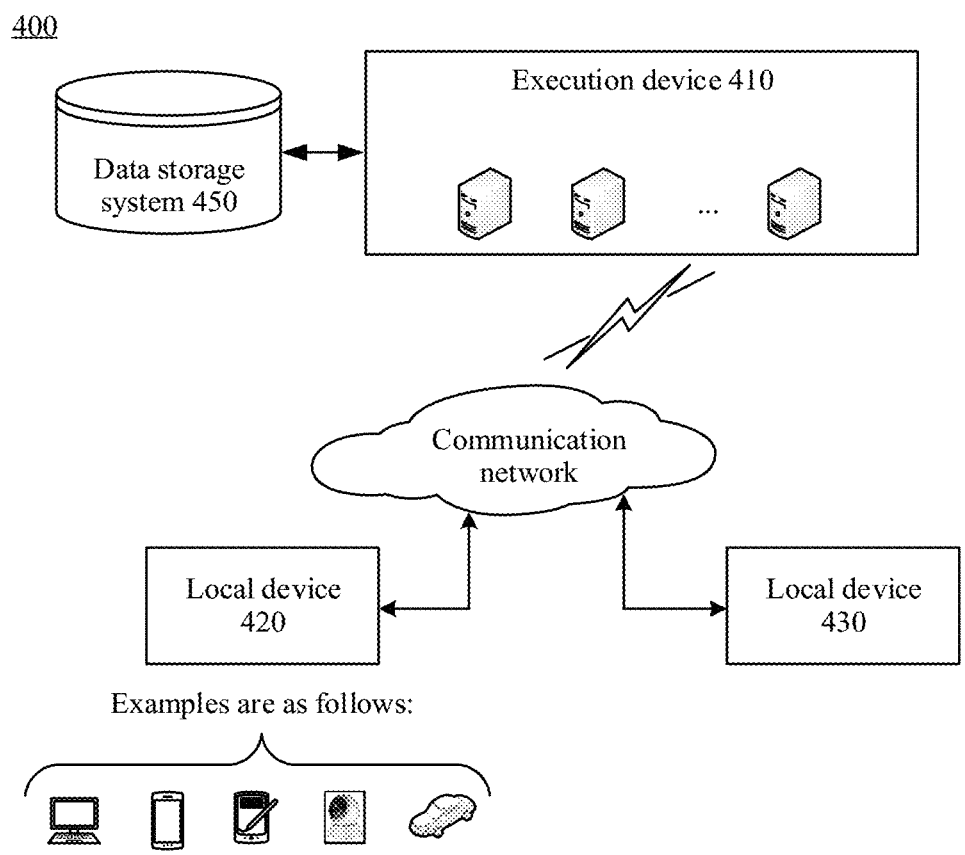
FIG. 4 is a schematic diagram of a system architecture according to an embodiment of this application.

FIG. 4 shows a system architecture according to an embodiment of this application. A system architecture 400 may include a local device 420, a local device 430, an execution device 410, and a data storage system 450. The local device 420 and the local device 430 are connected to the execution device 410 through a communication network.

For example, the execution device 410 may be implemented by one or more servers.

In some embodiments, the execution device 410 may be used in cooperation with another computation device, for example, a data storage device, a router, or a load balancer. The execution device 410 may be disposed on one physical station, or distributed on a plurality of physical stations. The execution device 410 may use data in the data storage system 450 or invoke program code in the data storage system 450 to perform the method for processing a combination optimization task in this embodiment of this application.

It should be noted that the execution device 410 may also be referred to as a cloud device. In this case, the execution device 410 may be deployed on the cloud.

In an example, the execution device 410 may obtain a target hyperparameter of a to-be-trained classification model. The target hyperparameter is used to control a gradient update operation of the to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The execution device 410 may further update the weight parameter of the to-be-trained classification model based on the target hyperparameter and a target training manner, to obtain a trained classification model. According to the target training manner, a modulus length of the weight parameter of the to-be-trained classification model before update is the same as a modulus length of an updated weight parameter of the to-be-trained classification model.

In a possible embodiment, the classification model training method in this embodiment of this application may be an offline method performed on a cloud. For example, the training method in this embodiment of this application may be performed by the execution device 410.

In a possible embodiment, the classification model training method in this embodiment of this application may be performed by the local device 420 or the local device 430.

In an example, the execution device 410 may obtain candidate values of a target hyperparameter. The target hyperparameter is used to control a gradient update operation of a to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The execution device 410 may further obtain a performance parameter of the to-be-trained classification model based on the candidate values and a target training manner. According to the target training manner, a modulus length of the weight parameter of the to-be-trained classification model before update is the same as a modulus length of an updated weight parameter of the to-be-trained classification model. The performance parameter includes precision of the to-be-trained classification model. The execution device 410 may further determine a target value of the target hyperparameter from the candidate values based on the performance parameter.

In a possible embodiment, the hyperparameter search method in this embodiment of this application may be an offline method performed on a cloud. For example, the search method in this embodiment of this application may be performed by the execution device 410.

In a possible embodiment, the hyperparameter search method in this embodiment of this application may be performed by the local device 420 or the local device 430.

For example, users may operate respective user equipment (for example, the local device 420 and the local device 430) to interact with the execution device 410. Each local device may be any computation device, for example, a personal computer, a computer workstation, a smartphone, a tablet computer, an intelligent camera, a smart automobile, another type of cellular phone, a media consumption device, a wearable device, a set-top box, or a game console. A local device of each user may interact with the execution device 410 through a communication network using any communication mechanism/communication standard. The communication network may be a wide area network, a local area network, a point-to-point connection, or any combination thereof.

The following describes the technical solutions in embodiments of this application in detail with reference to FIG. 5 to FIG. 8.

FIG. 5 is a schematic flowchart of a classification model training method according to an embodiment of this application. In some examples, a training method 500 may be performed by a device such as the execution device 210 in FIG. 2, the chip shown in FIG. 3, and the execution device 410 or the local device in FIG. 4. The method 500 in FIG. 5 may include operation S510 to operation S520. The following separately describes these operations in detail.

S510: Obtain a target hyperparameter of a to-be-trained classification model.

The target hyperparameter is used to control a gradient update operation of the to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged.

It should be noted that, when a parameter of a neural network has a scaling invariance, an equivalent step size of a weight parameter of the neural network is inversely proportional to a square of a modulus length of the weight parameter. The scaling invariance means that a weight w is multiplied by any scaling coefficient, and an output y of the layer may remain unchanged. A function of a weight decay hyperparameter is mainly to constrain the modulus length of the parameter, to avoid sharp decrease of the step size with increase of the modulus length of the weight parameter. However, because weight decay is an implicit constraint, the modulus length of the weight parameter still changes with a training process. As a result, for different models, an optimal weight decay hyperparameter needs to be manually adjusted.

In this embodiment of this application, according to the target training manner, that is, a displayed fixed parameter modulus length, the modulus length of the weight parameter of the to-be-trained classification model before update is the same as the modulus length of the updated weight parameter of the to-be-trained classification model. Impact of the modulus length of the weight parameter on the operation remains constant. This implements weight decay effect, and no manual adjustment is required. A prerequisite for using the target training manner is that the neural network needs to have the scaling invariance. Generally, for most neural networks, most layers have the scaling invariance, but most classification layers in a classification model are scaling sensitive. Therefore, in this embodiment of this application, the scaling invariance linear layer is used to replace an original classification layer, so that each layer of the to-be-trained classification model has the scaling invariance. For example, for the scaling invariance linear layer, refer to the following FIG. 6.

For example, the classification model may include any neural network model having a classification function. For example, the classification model may include but is not limited to a detection model, a segmentation model, a recognition model, and the like.

For example, the target hyperparameter may be an equivalent learning rate. A function of the equivalent learning rate in the to-be-trained classification model may be considered as the same as or similar to a function of the learning rate. The equivalent learning rate is used to control the gradient update operation of the to-be-trained classification model.

S520: Update the weight parameter of the to-be-trained classification model based on the target hyperparameter and a target training manner, to obtain a trained classification model.

According to the target training manner, a modulus length of the weight parameter of the to-be-trained classification model before update is the same as a modulus length of an updated weight parameter of the to-be-trained classification model.

It should be understood that, when the classification model is trained, the target hyperparameter usually needs to be configured, to perform iterative update on the weight parameter of the classification model, so that the classification model converges. In other words, a difference between a predicted classification result output by the classification model for a sample classification feature and a true value corresponding to the sample feature is less than or equal to a preset range. The target hyperparameter may be the equivalent learning rate. The function of the equivalent learning rate in the to-be-trained classification model may be considered as the same as or similar to the function of the learning rate. The equivalent learning rate is used to control the gradient update operation of the to-be-trained classification model.

In a possible embodiment, the weight parameter of the trained classification model is obtained through a plurality of iterative updates by using a backpropagation algorithm and based on the target hyperparameter and the target training manner.

In a possible embodiment, the scaling invariance linear layer obtains the predicted classification result according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, $X$ represents a to-be-classified feature, and $S$ represents a scale constant.

It should be noted that the foregoing formula is used as an example to describe the scaling invariance processing. An objective of the scaling invariance linear layer is to multiply the weight w by the any scaling coefficient, and the output y of the layer may remain unchanged. In other words, the scaling invariance processing may alternatively be performed in another specific processing manner. This is not limited in this application.

In a possible embodiment, the target training manner includes:

processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

In this embodiment of this application, the classification layer of the to-be-trained classification model is replaced with the scaling invariance linear layer, and the modulus lengths of the weight parameters before and after the update of the to-be-trained classification model are fixed by using the target training manner, so that two important hyperparameters, that is, a learning rate and the weight decay, can be equivalently replaced with target hyperparameters during training of the to-be-classified model. Therefore, when the to-be-trained classification model is trained, only the target hyperparameter of the to-be-trained model needs to be configured, so that computing resources consumed for training the to-be-trained classification model can be reduced.

FIG. 7 is a schematic flowchart of a hyperparameter search method according to an embodiment of this application. In some examples, a search method 600 may be performed by a device such as the execution device 210 in FIG. 2, the chip shown in FIG. 3, and the execution device 410 or the local device in FIG. 4. The method 600 in FIG. 7 may include operation S610 to operation S630. The following separately describes these operations in detail.

S610: Obtain candidate values of a target hyperparameter.

The target hyperparameter is used to control a gradient update operation of the to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged.

It should be noted that, in this embodiment of this application, a classification layer in the to-be-trained classification model may be replaced with the scaling invariance linear layer, so that each layer in the to-be-classified training model has scaling invariance, that is, scaling insensitivity. For example, for the scaling invariance linear layer, refer to FIG. 6.

In a possible embodiment, the scaling invariance linear layer obtains the predicted classification result according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

S620: Obtain a performance parameter of the to-be-trained classification model based on the candidate values and a target training manner.

According to the target training manner, a modulus length of the weight parameter of the to-be-trained classification model before update is the same as a modulus length of an updated weight parameter of the to-be-trained classification model. The performance parameter includes precision of the to-be-trained classification model.

It should be understood that the performance parameter of the to-be-trained classification model may be used to evaluate a performance parameter of the to-be-trained classification model after a target hyperparameter is configured for the to-be-trained classification model. For example, the performance parameter may include model precision of the to-be-trained classification model, that is, may refer to accuracy of a predicted classification result of classifying a to-be-classified feature by the to-be-trained classification model.

It should be noted that, in this embodiment of this application, two important hyperparameters, that is, a learning rate and weight decay, included in the to-be-trained classification model may be equivalently replaced with the target hyperparameter by using the target training manner. Because according to the target training manner, the modulus length of the weight parameter of the to-be-trained classification model before update is the same as the modulus length of the updated weight parameter of the to-be-trained classification model, when the to-be-trained classification model is trained, only the target hyperparameter needs to be searched for, to determine the target value of the target hyperparameter. The target hyperparameter may be an equivalent learning rate. A function of the equivalent learning rate in the to-be-trained classification model may be considered as the same as or similar to a function of the learning rate. The equivalent learning rate is used to control the gradient update operation of the to-be-trained classification model.

In a possible embodiment, the target training manner includes:

processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

In this embodiment of this application, when each layer of the to-be-trained classification model has the scaling invariance, the weight of the to-be-trained classification model is iteratively updated by using the target training manner, so that the modulus length of the weight parameter before update is the same as the modulus length of the updated weight parameter. In other words, weight decay effect can be implemented by using the target training manner, and manual adjustment is not required.

S630: Determine a target value of the target hyperparameter from the candidate values based on the performance parameter of the to-be-trained classification model.

The target value of the target hyperparameter may be a value corresponding to the target hyperparameter when the to-be-trained classification model can meet a preset condition.

In this embodiment of this application, the classification layer in the to-be-trained classification model may be replaced with the scaling invariance linear layer in the to-be-trained classification model, so that each layer of the to-be-trained classification model has the scaling invariance. Further, the target training manner is used, so that optimal precision that can be achieved by adjusting the two hyperparameters (the learning rate and the weight decay) in normal training can be achieved by adjusting only one target hyperparameter. In other words, a search process of the two hyperparameters is equivalently replaced with a search process of the one target hyperparameter, to reduce a search dimension of the hyperparameter, and accelerate a search speed.

In a possible embodiment, precision of the to-be-trained classification model corresponding to the target value is greater than precision of the to-be-trained classification model corresponding to another candidate value in the candidate values.

In this embodiment of this application, the target value of the target hyperparameter may be a corresponding candidate value that enables model precision of the to-be-trained classification model to reach optimal precision in the candidate values of the target hyperparameter that are allocated to the to-be-trained classification model.

In a possible embodiment, the obtaining candidate values of a target hyperparameter includes:

evenly dividing an initial search range of the target hyperparameter to obtain the candidate values of the target hyperparameter.

In this embodiment of this application, the candidate values of the target hyperparameter may be a plurality of candidate values of the target hyperparameter obtained by evenly dividing the initial search range set by a user.

In an example, in addition to the foregoing evenly dividing the initial search range to obtain the plurality of candidate values, the initial search range may also be divided in another manner.

Further, in this embodiment of this application, to quickly find the target value of the target hyperparameter, that is, the optimal target hyperparameter, when searching for the target hyperparameter, the initial search range of the target hyperparameter may be updated based on monotonicity of the performance parameter of the to-be-trained classification model, to narrow a search range of the target hyperparameter and improve search efficiency of the target hyperparameter. For a specific procedure, refer to the following FIG. 8.

In a possible embodiment, the method further includes: updating the initial search range of the target hyperparameter based on a current quantity of training operations, a preconfigured quantity of training operations, and a change trend of precision of the to-be-trained classification model.

For example, the initial search range of the target hyperparameter may be updated based on the current quantity of training operations, the preconfigured quantity of training operations, and monotonicity of the precision of the to-be-trained classification model.

In a possible embodiment, the updating the initial search range of the target hyperparameter based on a current quantity of training operations, a preconfigured quantity of training operations, and a change trend of precision of the to-be-trained classification model includes:

if the current quantity of training operations is less than the preconfigured quantity of training operations, updating an upper limit of the initial search range of the target hyperparameter to a candidate value of the target hyperparameter corresponding to optimal precision of the to-be-trained classification model in the current quantity of training operations.

In a possible embodiment, the updating the initial search range of the target hyperparameter based on a current quantity of training operations, a preconfigured quantity of training operations, and a change trend of precision of the to-be-trained classification model includes:

if the current quantity of training operations is equal to the preconfigured quantity of training operations, updating an upper limit of the initial search range of the target hyperparameter to a first candidate value, and updating a lower limit of a search range of the target hyperparameter to a second candidate value. The first candidate value and the second candidate value are candidate values adjacent to a candidate value of the target hyperparameter corresponding to optimal precision of the to-be-trained classification model.

Figure 6:
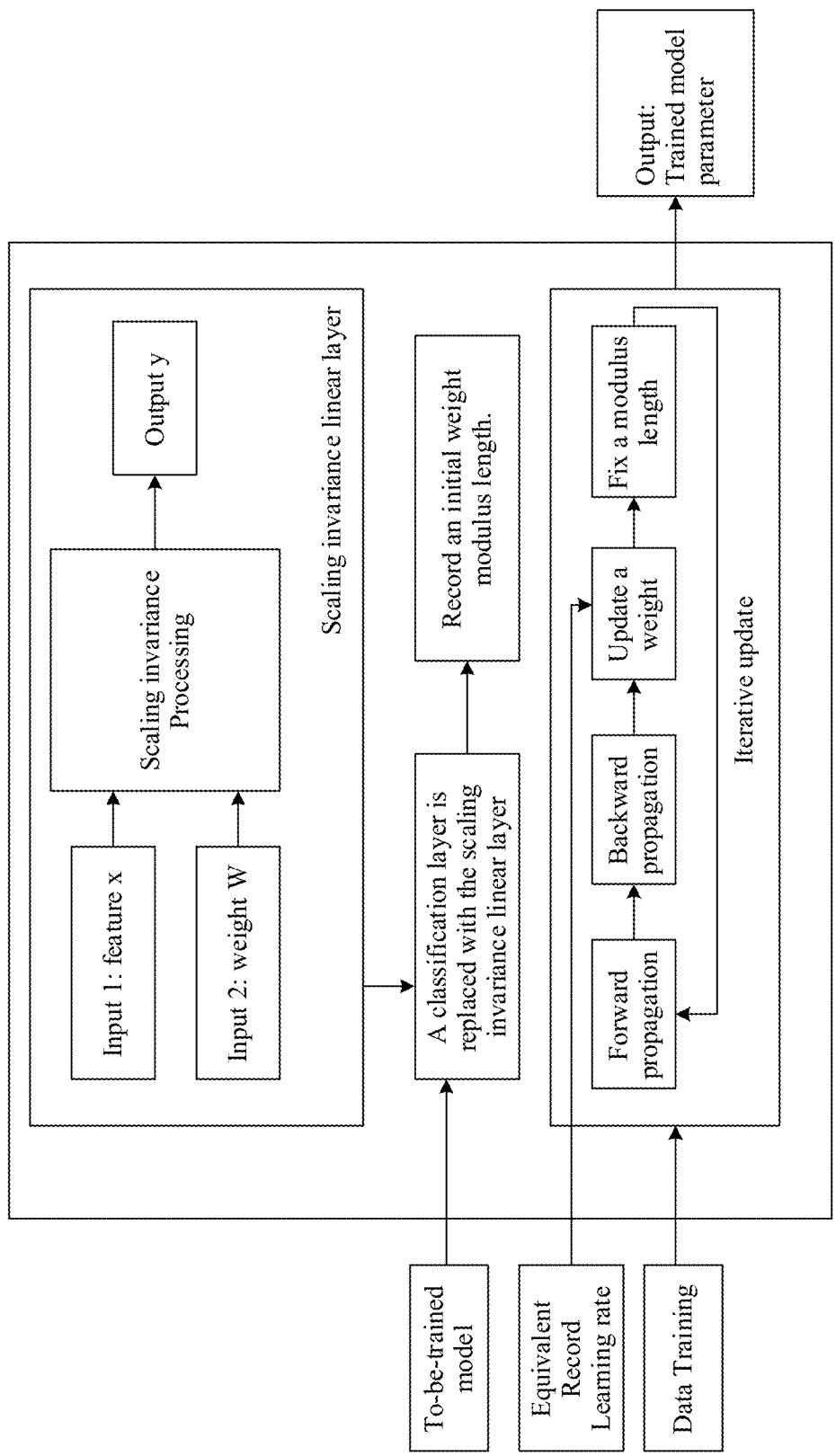
FIG. 6 is a schematic diagram of performing iterative update on a weight of a to-be-trained classification model based on a scaling invariance linear layer and a modulus length fixed manner according to an embodiment of this application.

FIG. 6 is a schematic diagram of performing iterative update on a weight of a to-be-trained classification model based on a scaling invariance linear layer according to an embodiment of this application.

It should be noted that, when a parameter of a neural network has a scaling invariance, an equivalent step size of a weight parameter of the neural network is inversely proportional to a square of a modulus length of the parameter. The scaling invariance means that a weight w is multiplied by any scaling coefficient, and an output y of the layer may remain unchanged. A function of a weight decay hyperparameter is mainly to constrain the modulus length of the parameter, to avoid sharp decrease of the equivalent step size with increase of the modulus length of the parameter. However, because weight decay is an implicit constraint, the modulus length of the parameter still changes with a training process. As a result, for different models, optimal weight decay needs to be manually adjusted.

According to the weight training method for the to-be-trained classification model shown in FIG. 6, the target training manner, that is, a displayed fixed parameter modulus length, may be used, so that effect of the parameter modulus length on an equivalent operation remains constant. This implements effect of the weight decay, and no manual adjustment is required. A prerequisite for using the weight training method of the neural network shown in FIG. 6 is that the neural network needs to have the scaling invariance. Generally, for most neural networks, most layers have scaling invariance, but a final classification layer is generally scaling sensitive. Therefore, as shown in FIG. 6, in this embodiment of this application, the scaling invariance linear layer is used to replace an original classification layer, so that each layer of the neural network has the scaling invariance.

As shown in FIG. 6, when a parameter of the to-be-trained classification model is trained, an initial weight parameter of the to-be-trained classification model, for example, a first weight parameter $W_i$ and a feature X are obtained from training data. Scaling invariance processing is performed on the first weight parameter $W_i$ and the feature X by using the scaling invariance linear layer, to obtain a prediction result $Y_i$. For example, for the classification model, the prediction output result $Y_i$ may be a predicted classification label corresponding to the feature X.

For example, the scaling invariance linear layer may process the first weight parameter and the feature according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

It should be understood that the foregoing formula is used as an example to describe the scaling invariance processing. An objective of the scaling invariance linear layer is to multiply the weight w by the any scaling coefficient, and the output y of the layer may remain unchanged. In other words, the scaling invariance processing may alternatively be performed in another specific processing manner. This is not limited in this application.

Further, an initial weight modulus length of the to-be-trained classification model may be obtained based on the initial weight parameter of the to-be-trained classification model, and is denoted as $Norm_0$.

Then, the first weight parameter is updated in a forward propagation and backpropagation manner based on an input equivalent learning rate parameter and the prediction result $Y_i$ output by the scaling invariance linear layer.

For example, the first weight parameter may be updated based on a difference between the prediction result $Y_i$ and a truth value corresponding to the feature X, so that precision of an output prediction result of the to-be-trained classification model meets a preset range.

Further, in this embodiment of this application, when the first weight parameter is updated, fixed modulus length processing may be performed on an updated second weight parameter. The fixed modulus length processing means that effect of implementing a weight decay hyperparameter before and after the weight parameter is updated is the same.

For example, the following formula may be used to perform the fixed modulus length processing on the updated weight parameter in an $(i+1)^{th}$ iterative update:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

The performance parameter corresponding to the to-be-trained classification model and the weight of the to-be-trained classification model are returned by performing iterative update on the weight parameter and repeatedly performing training operations for E times. The performance parameter may be precision when the to-be-trained classification model performs classification processing.

In this embodiment of this application, the classification layer in the to-be-trained classification model may be replaced with the scaling invariance linear layer in the to-be-trained classification model, so that each layer of the to-be-trained classification model has the scaling invariance. Further, the target training manner is used, so that optimal precision that can be achieved by adjusting the two hyperparameters (the learning rate and the weight decay) in normal training can be achieved by adjusting only one target hyperparameter. In other words, a search process of the two hyperparameters is equivalently replaced with a search process of the one target hyperparameter, to reduce a search dimension of the hyperparameter, improve search efficiency of the target hyperparameter, and reduce search costs of the hyperparameter.

Figure 8:
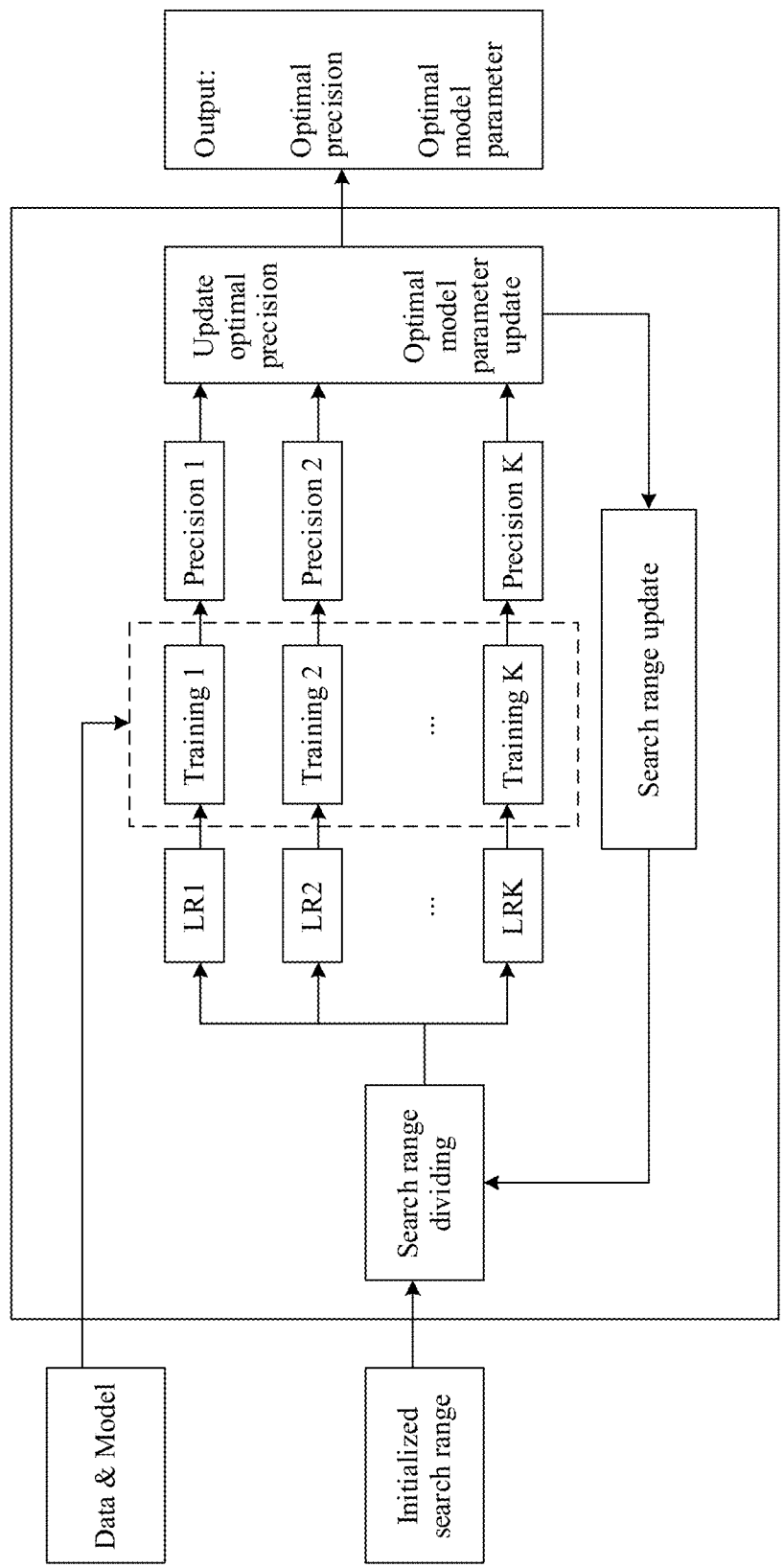
FIG. 8 is a schematic diagram of a hyperparameter search method according to an embodiment of this application.

FIG. 8 is a schematic diagram of a hyperparameter search method according to an embodiment of this application. It should be understood that for a process of any one of training 1 to training K in FIG. 8, refer to a schematic diagram shown in FIG. 6.

For example, it is assumed that fast equivalent learning rate searching is search ($LR_{min}, LR_{max}, K, T\{E_t\}$). A range of an input equivalent learning rate is [$LR_{min}, LR_{max}$] A division quantity is K. A quantity of search rounds is T. A quantity of search training operations in each round is $E_t$, $E_T$ is a maximum quantity of training rounds. $E_t \leq E_T, \forall t \in \{1, 2, \ldots, T-1\}$. A global optimal precision $acc_{best}$ is output. A global optimal model weight $W_{best}$ is output.

The search method includes the following operations.

Operation 1: Determine that a search process cyclically performs T rounds; for t in $\{1, 2, \ldots, T-1\}$.

Operation 2: Divide a range of the equivalent learning rate, to obtain K candidate values of the equivalent learning rate.

For example, the range of the equivalent learning rate may be evenly divided, to obtain K candidate values of the equivalent learning rate, that is, $$LR_i = \left\{ \frac{(LR_{max} - LR_{min})}{K-1} * i + LR_{min} \,\middle|\, i \in \{0, 1, \ldots, K-1\} \right\}.$$

Operation 3: Separately perform the training process shown in FIG. 6 on the candidate values $LR_i$ of the K equivalent learning rates, where a quantity of training operations is $E_t$, and obtain precision Acc of a corresponding to-be-trained classification model and a weight W of the to-be-trained classification model.

Operation 4: Determine an identifier corresponding to optimal precision of the to-be-trained classification model, that is, idx=arg max(Acc).

Further, in this embodiment of this application, the search range may be updated based on the determined optimal precision.

Operation 5: If the current quantity of training operations is less than a maximum quantity of training operations $E_t$, update an upper bound of the range of the equivalent learning rate to a candidate value of the equivalent learning rate corresponding to the optimal precision, that is, $LR_{max} = LR_{tdx}$.

Operation 6: If the current quantity of training operations is equal to the maximum quantity of training operations $E_t$, update upper and lower bounds of the range of the equivalent learning rate to $LR_{idx+1}$ and $LR_{idx-1}$ respectively, that is, $LR_{max} = LR_{idx+1}$; $LR_{min} = LR_{tdx-1}$.

Operation 7: If the current optimal precision is greater than the global optimal precision, update the global optimal precision and the global optimal model weight, that is, $acc_{best} = Acc_{idx}$; $W_{best} = W_{idx}$.

In this embodiment of this application, the range of the equivalent learning rate may be evenly divided by using a single-peak trend of the precision of the to-be-trained classification model about the equivalent learning rate, so that the range of the optimal equivalent learning rate in the case of the current quantity of training rounds can be quickly determined. In other words, the range of the optimal equivalent learning rate can be quickly reduced by phase based on monotonicity of the optimal equivalent learning rate in different quantities of training rounds, to quickly obtain the optimal equivalent learning rate.

In an example, the hyperparameter search method provided in this embodiment of this application is applied to hyperparameter optimization of an ImageNet image classification task. An example in which a deep neural network is ResNet50 is used for description.

Operation 1: First set an initial parameter of the target hyperparameter. For example, a range of a learning rate may be [0.1, 3.2]. A division quantity is 5. A quantity of search rounds is 2. A quantity of search operations in each round is {25000, 125000}. Then, search for the target hyperparameter starts.

Operation 2: First round of search.

For example, five points are evenly selected in a range of the learning rate [0.1, 3.2]. A weight parameter of the deep neural network is separately trained by using the training method shown in FIG. 6. A quantity of training rounds may be 25000. Test precision corresponding to each learning rate candidate value is obtained.

For example, if optimal precision is 74.12, and a corresponding learning rate is 1.55, the range of the learning rate may be updated to [0.1, 1.55], and the optimal precision is updated to 74.12.

Operation 3: Perform a second round of search.

For example, five points are evenly selected in a range of the learning rate [0.1, 1.55]. The weight parameter of the deep neural network is separately trained by using the training method shown in FIG. 6. The quantity of training rounds may be 125000. The test precision corresponding to each learning rate candidate value is obtained.

For example, the optimal precision is 77.64, the corresponding learning rate is 1.0875, and the optimal precision is updated to 77.64.

Operation 4: The search is complete.

For example, the optimal learning rate is 1.0875, the optimal precision of the corresponding deep neural network is 77.64, and a model weight of the corresponding deep neural network is returned.

TABLE 1

| Model | Baseline | Bayesian | Bayesian Cost | Our Method | Our Method Cost |
|---|---|---|---|---|---|
| Model 1 | 76.3 | 77.664 | 35 | 77.64 | 6 |
| Model 2 | 72.0 | 72.346 | 35 | 72.634 | 6 |
| Model 3 | 74.7 | 75.934 | 30 | 76.048 | 6 |

Table 1 shows test results of model precision and resource overheads corresponding to different models in which hyperparameter optimization is not used, Bayesian hyperparameter optimization is used, and the hyperparameter search method proposed in this application is used.

The model 1 represents a residual model (for example, ResNet50). The model 2 represents a MobileNetV2 model. The model 3 represents MobileNetV2×1.4. Baseline represents precision (unit: %) when hyperparameter optimization is not performed. Bayesian represents precision (unit: %) after hyperparameter optimization is performed by using a Bayesian optimization method. Bayesian Cost represents resource overheads (unit: multiple of a single training overhead) after hyperparameter optimization is performed by using the Bayesian optimization method. Our Method represents precision (unit: %) after hyperparameter optimization is performed by using the method in this application. Our Method Cost represents resource overheads (unit: a multiple of a single training overhead) of hyperparameter optimization performed by using the hyperparameter search method proposed in this application.

It can be learned from the test results shown in Table 1 that, in the ImageNet image classification task, for different deep neural network models, models obtained by using the hyperparameter search method proposed in this application can be significantly better than models without hyperparameter optimization, and reach or exceed model precision obtained by using the Bayesian hyperparameter optimization method. In addition, resource overheads are far less than models obtained by using the Bayesian hyperparameter optimization method.

It should be noted that the foregoing example description is merely intended to help a person skilled in the art understand embodiments of this application, instead of limiting embodiments of this application to the illustrated specific value or specific scenario. A person skilled in the art definitely can make various equivalent modifications or changes based on the examples described above, and such modifications or changes also fall within the scope of embodiments of this application.

The foregoing describes in detail the classification model training method and the hyperparameter search method provided in embodiments of this application with reference to FIG. 1 to FIG. 8. The following describes in detail apparatus embodiments of this application with reference to FIG. 9 to FIG. 12. It should be understood that the training apparatus in this embodiment of this application may perform the training method in the foregoing embodiments of this application, and the searching apparatus in this embodiment of this application may perform various search methods in the foregoing embodiments of this application. To be specific, for specific working processes of the following products, refer to corresponding processes in the foregoing method embodiments.

Figure 9:
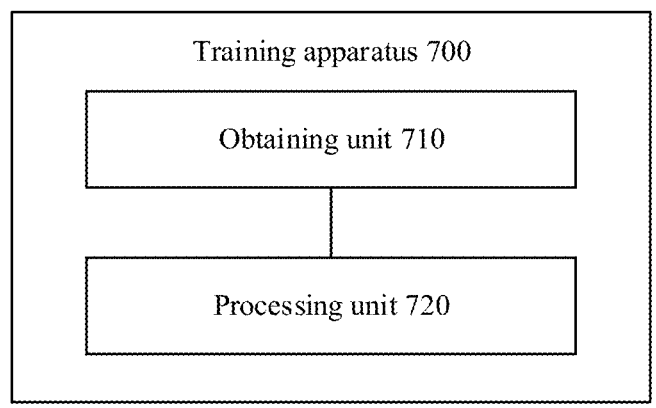
FIG. 9 is a schematic block diagram of a classification model training apparatus according to an embodiment of this application.

FIG. 9 is a schematic block diagram of a classification model training apparatus according to this application.

It should be understood that a training apparatus 700 may perform the training method shown in FIG. 5 or FIG. 6. The training apparatus 700 includes an obtaining unit 710 and a processing unit 720.

The obtaining unit 710 is configured to obtain a target hyperparameter of a to-be-trained classification model. The target hyperparameter is used to control a gradient update operation of the to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The processing unit 720 is configured to update the weight parameter of the to-be-trained classification model based on the target hyperparameter and a target training manner, to obtain a trained classification model. According to the target training manner, a modulus length of the weight parameter of the to-be-trained classification model before update is the same as a modulus length of an updated weight parameter of the to-be-trained classification model.

In an embodiment, the weight parameter of the trained classification model is obtained through a plurality of iterative updates by using a backpropagation algorithm and based on the target hyperparameter and the target training manner.

In an embodiment, the scaling invariance linear layer obtains the predicted classification result according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

In an embodiment, the target training manner includes:
processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

In an example, the training apparatus 700 may be configured to perform all or some operations in the training method shown in any one of FIG. 5 or FIG. 6. For example, the obtaining unit 710 may be configured to perform all or some operations of S510 or obtaining the to-be-trained model, the target hyperparameter (for example, the equivalent learning rate), and the training data. The processing unit 720 may be configured to perform all or some operations of S520 or performing iterative update on the weight parameter of the to-be-trained model. The obtaining unit 710 may be a communication interface or a transceiver in the training apparatus 700. The processing unit 720 may be a processor or a chip that has a computing capability in the training apparatus 700.

Figure 10:
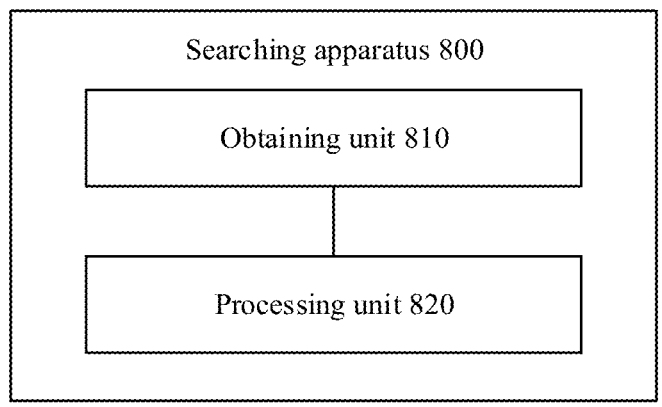
FIG. 10 is a schematic block diagram of a hyperparameter searching apparatus according to an embodiment of this application.

FIG. 10 is a schematic block diagram of a hyperparameter searching apparatus according to this application.

It should be understood that a searching apparatus 800 may perform the search method shown in FIG. 7 or FIG. 8. The searching apparatus 800 includes an obtaining unit 810 and a processing unit 820.

The obtaining unit 810 is configured to obtain candidate values of a target hyperparameter. The target hyperparameter is used to control a gradient update operation of a to-be-trained classification model. The to-be-trained classification model includes a scaling invariance linear layer. The scaling invariance linear layer enables a predicted classification result output when a weight parameter of the to-be-trained classification model is multiplied by any scaling coefficient to remain unchanged. The processing unit 820 is configured to obtain a performance parameter of the to-be-trained classification model based on the candidate values and a target training manner. According to the target training manner, a modulus length of the weight parameter of the to-be-trained classification model before update is the same as a modulus length of an updated weight parameter of the to-be-trained classification model. The performance parameter includes precision of the to-be-trained classification model. The processing unit is further configured to determine a target value of the target hyperparameter from the candidate values based on the performance parameter.

In an embodiment, precision of the to-be-trained classification model corresponding to the target value is greater than precision of the to-be-trained classification model corresponding to another candidate value in the candidate values.

In an embodiment, the obtaining unit 810 is specifically configured to:
evenly divide an initial search range of the target hyperparameter to obtain the candidate values of the target hyperparameter.

In an embodiment, the processing unit 820 is further configured to:
update the initial search range of the target hyperparameter based on a current quantity of training operations, a preconfigured quantity of training operations, and a change trend of precision of the to-be-trained classification model.

In an embodiment, the processing unit 820 is specifically configured to:
if the current quantity of training operations is less than the preconfigured quantity of training operations, update an upper limit of the initial search range of the target hyperparameter to a candidate value of the target hyperparameter corresponding to optimal precision of the to-be-trained classification model in the current quantity of training operations.

In an embodiment, the processing unit 820 is specifically configured to:
if the current quantity of training operations is equal to the preconfigured quantity of training operations, update an upper limit of the initial search range of the target hyperparameter to a first candidate value, and update a lower limit of a search range of the target hyperparameter to a second candidate value. The first candidate value and the second candidate value are candidate values adjacent to a candidate value of the target hyperparameter corresponding to optimal precision of the to-be-trained classification model.

In an embodiment, the scaling invariance linear layer obtains the predicted classification result according to the following formula:

$$Y_i = \frac{X^T W_i}{\|W_i\|} * S.$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

In an embodiment, the target training manner includes:
processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0.$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

In an example, the searching apparatus 800 may be configured to perform all or some operations in the search method shown in any one of FIG. 7 or FIG. 8. For example, the obtaining unit 810 may be configured to perform all or some operations of S610, obtaining the initialized search range, or obtaining the data and the model. The processing unit 820 may be configured to perform all or some operations of S620, S630, or searching for the target hyperparameter. The obtaining unit 810 may be a communication interface or a transceiver in the searching apparatus 800. The processing unit 820 may be a processor or a chip that has a computing capability in the searching apparatus 800.

It should be noted that the training apparatus 700 and the searching apparatus 800 are embodied in a form of functional units. The term "unit" herein may be implemented in a form of software and/or hardware. This is not specifically limited.

For example, the "unit" may be a software program, a hardware circuit, or a combination thereof for implementing the foregoing function. The hardware circuit may include an application-specific integrated circuit (ASIC), an electronic circuit, a processor (for example, a shared processor, a dedicated processor, or a group processor) configured to execute one or more software or firmware programs and a memory, a combined logic circuit, and/or other suitable components that support the described functions.

Therefore, the units in the examples described in this embodiment of this application can be implemented by using electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the embodiment goes beyond the scope of this application.

Figure 11:
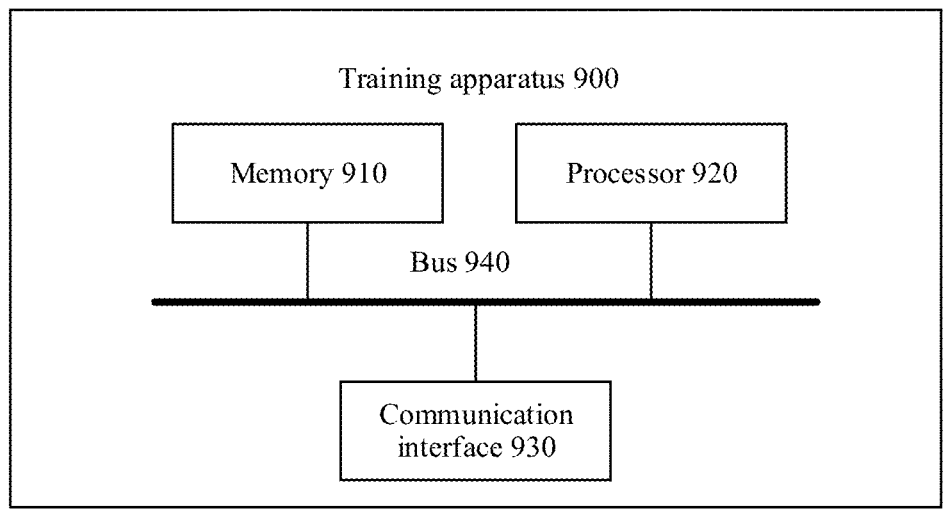
FIG. 11 is a schematic diagram of a hardware structure of a classification model training apparatus according to an embodiment of this application.

FIG. 11 is a schematic diagram of a hardware structure of a classification model training apparatus according to an embodiment of this application.

A training apparatus 900 shown in FIG. 11 includes a memory 910, a processor 920, a communication interface 930, and a bus 940. The memory 910, the processor 920, and the communication interface 930 implement mutual communication connections through the bus 940.

The memory 910 may be a read only memory (ROM), a static storage device, a dynamic storage device, or a random access memory (RAM). The memory 910 may store a program. When the program stored in the memory 910 is executed by the processor 920, the processor 920 is configured to perform the operations of the classification model training method in embodiments of this application, for example, perform the operations shown in FIG. 5 or FIG. 6.

It should be understood that the training apparatus shown in embodiments of this application may be a server, or may be a chip configured in a server.

The training apparatus may be a device having a function of training a classification model, for example, may include any device known in the conventional technology. Alternatively, the training apparatus may be a chip having a function of training a classification model. The training apparatus may include a memory and a processor. The memory may be configured to store program code. The processor may be configured to invoke the program code stored in the memory, to implement a corresponding function of a computing device. A processor and a memory included in the computing device may be implemented by using a chip. This is not specifically limited herein.

For example, the memory may be configured to store related program instructions of the classification model training method provided in embodiments of this application. The processor may be configured to invoke the related program instructions of the classification model training method stored in the memory.

The processor 920 may be a general-purpose central processing unit (CPU), a microprocessor, an application-specific integrated circuit (ASIC), or one or more integrated circuits. The processor 920 is configured to execute a related program, to implement the classification model training method in the method embodiments of this application.

The processor 920 may be an integrated circuit chip and has a signal processing capability. During embodiment, operations of the classification model training method in this application may be completed by using an integrated logic circuit of hardware in the processor 920 or instructions in a form of software.

The processor 920 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the operations, and logical block diagrams that are disclosed in embodiments of this application. The general-purpose processor may be a microprocessor, or the processor may be any conventional processor or the like. Operations of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 910. The processor 920 reads information in the memory 910, and completes, in combination with hardware of the processor 920, functions that need to be performed by the units included in the training apparatus shown in FIG. 9 in an embodiment of this application, or performs the classification model training method shown in FIG. 5 or FIG. 6 in the method embodiments of this application.

The communication interface 930 uses a transceiver apparatus, for example but not for limitation, a transceiver, to implement communication between the training apparatus 900 and another device or a communication network.

The bus 940 may include a path for transmitting information between the components (for example, the memory 910, the processor 920, and the communication interface 930) of the training apparatus 900.

Figure 12:
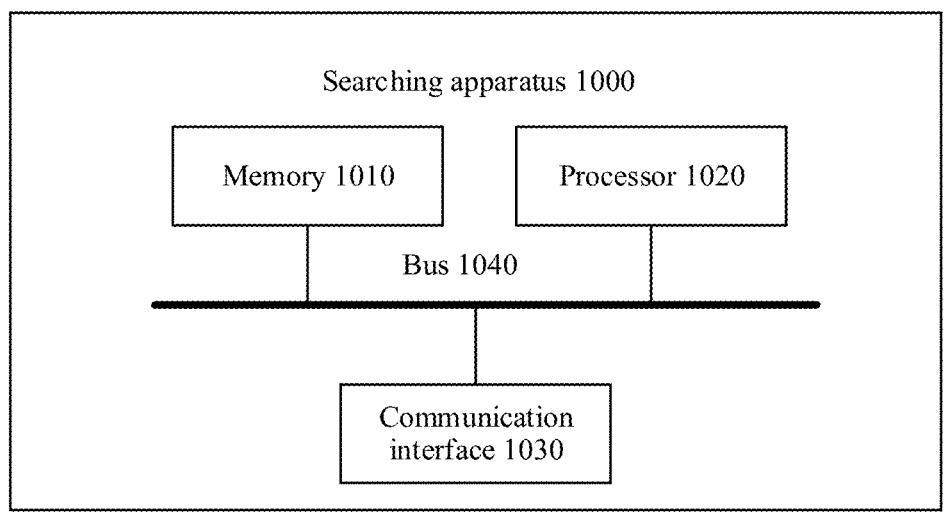
FIG. 12 is a schematic diagram of a hardware structure of a hyperparameter searching apparatus according to an embodiment of this application.

FIG. 12 is a schematic diagram of a hardware structure of a hyperparameter searching apparatus according to an embodiment of this application.

A searching apparatus 1000 shown in FIG. 12 includes a memory 1010, a processor 1020, a communication interface 1030, and a bus 1040. The memory 1010, the processor 1020, and the communication interface 1030 implement mutual communication connections through the bus 1040.

The memory 1010 may be a read only memory (read only memory, ROM), a static storage device, a dynamic storage device, or a random access memory (RAM). The memory 1010 may store a program. When the program stored in the memory 1010 is executed by the processor 1020, the processor 1020 is configured to perform the operations of the hyperparameter search method in embodiments of this application, for example, perform the operations shown in FIG. 7 or FIG. 8.

It should be understood that the searching apparatus shown in embodiments of this application may be a server, or may be a chip configured in a server.

The searching apparatus may be a device having a hyperparameter searching function, for example, may include any device known in the conventional technology. Alternatively, the searching apparatus may also be a chip having a hyperparameter searching function. The searching apparatus may include a memory and a processor. The memory may be configured to store program code. The processor may be configured to invoke the program code stored in the memory, to implement a corresponding function of a computing device. A processor and a memory included in the computing device may be implemented by using a chip. This is not specifically limited herein.

For example, the memory may be configured to store related program instructions of the hyperparameter search method provided in embodiments of this application. The processor may be configured to invoke the related program instructions of the hyperparameter search method stored in the memory.

The processor 1020 may be a general-purpose central processing unit (CPU), a microprocessor, an application-specific integrated circuit (ASIC), or one or more integrated circuits. The processor 1020 is configured to execute a related program, to implement the hyperparameter search method in the method embodiments of this application.

The processor 1020 may be an integrated circuit chip and has a signal processing capability. During embodiment, operations of the hyperparameter search method in this application may be completed by using an integrated logic circuit of hardware in the processor 1020 or instructions in a form of software.

The processor 1020 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the operations, and logical block diagrams that are disclosed in embodiments of this application. The general-purpose processor may be a microprocessor, or the processor may be any conventional processor or the like. Operations of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1010. The processor 1020 reads information in the memory 1010, and completes, in combination with hardware of the processor 1020, functions that need to be performed by the units included in the searching apparatus shown in FIG. 10 in an embodiment of this application, or performs the hyperparameter search method shown in FIG. 7 to FIG. 8 in the method embodiments of this application.

The communication interface 1030 uses a transceiver apparatus, for example but not for limitation, a transceiver, to implement communication between the searching apparatus 1000 and another device or a communication network.

The bus 1040 may include a path for transmitting information between the components (for example, the memory 1010, the processor 1020, and the communication interface 1030) of the searching apparatus 1000.

It should be noted that, although only the memory, the processor, and the communication interface are shown in each of the training apparatus 900 and the searching apparatus 1000, in a specific embodiment process, a person skilled in the art should understand that the training apparatus 900 and the searching apparatus 1000 each may further include another component necessary for normal running. In addition, based on a specific requirement, a person skilled in the art should understand that the training apparatus 900 and the searching apparatus 1000 each may further include a hardware component for implementing another additional function. In addition, a person skilled in the art should understand that the searching apparatus 700 may include only components required for implementing this embodiment of this application, but does not need to include all components shown in FIG. 11 or FIG. 12.

For example, an embodiment of this application further provides a chip. The chip includes a transceiver unit and a processing unit. The transceiver unit may be an input/output circuit or a communication interface. The processing unit is a processor, a microprocessor, or an integrated circuit integrated into the chip. The chip may execute the foregoing training method in the method embodiments of this application.

For example, an embodiment of this application further provides a chip. The chip includes a transceiver unit and a processing unit. The transceiver unit may be an input/output circuit or a communication interface. The processing unit is a processor, a microprocessor, or an integrated circuit integrated into the chip. The chip may execute the foregoing search method in the method embodiments of this application.

For example, an embodiment of this application further provides a computer-readable storage medium. The computer readable storage medium stores instructions. When the instructions are executed, the training method in the foregoing method embodiments is performed.

For example, an embodiment of this application further provides a computer-readable storage medium. The computer readable storage medium stores instructions. When the instructions are executed, the search method in the foregoing method embodiments is performed.

For example, an embodiment of this application further provides a computer program product including instructions. When the instructions are executed, the training method in the foregoing method embodiments is performed.

For example, an embodiment of this application further provides a computer program product including instructions. When the instructions are executed, the search method in the foregoing method embodiments is performed.

It should be understood that, the processor in embodiments of this application may be a central processing unit (CPU). The processor may be further another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and indicates that there may be three relationships. For example, A and/or B may indicate the following three cases: Only A exists, both A and B exist, and only B exists. A and B may be singular or plural. In addition, the character "/" in this specification usually indicates an "or" relationship between associated objects, or may indicate an "and/or" relationship. A specific meaning depends on the context.

In this application, at least one means one or more, and a plurality of means two or more. At least one of the following items (e.g., pieces) or a similar expression thereof refers to any combination of these items, including any combination of singular items or plural items. For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the embodiment processes of embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding procedure in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. A classification model training method, comprising:
obtaining a target hyperparameter of a to-be-trained classification model, wherein the target hyperparameter controls a gradient update operation of the to-be-trained classification model, the to-be-trained classification model comprises a scaling invariance linear layer, and the scaling invariance linear layer enables a predicted classification result output when a weight parameter of the to-be-trained classification model is multiplied by any scaling coefficient to remain unchanged; and updating the weight parameter of the to-be-trained classification model, based on the target hyperparameter and a target training manner, to obtain a trained classification model, wherein according to the target training manner, a modulus length of the weight parameter of the to-be-trained classification model before update is the same as a modulus length of an updated weight parameter of the to-be-trained classification model.

2. The training method according to claim 1, wherein a weight parameter of the trained classification model is obtained through a plurality of iterative updates using a backpropagation algorithm and based on the target hyperparameter and the target training manner.

3. The training method according to claim 1, wherein the scaling invariance linear layer obtains the predicted classification result according to the following formula:

$$Y_i = \frac{X^T W_i}{\|W_i\|} * S; \text{ and}$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

4. The training method according to claim 1, wherein the target training manner comprises:

processing the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0; \text{ and}$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

5. A hyperparameter search method, comprising:
obtaining candidate values of a target hyperparameter, wherein the target hyperparameter controls a gradient update operation of a to-be-trained classification model, the to-be-trained classification model comprises a scaling invariance linear layer, and the scaling invariance linear layer enables a predicted classification result output when a weight parameter of the to-be-trained classification model is multiplied by any scaling coefficient to remain unchanged;

obtaining a performance parameter of the to-be-trained classification model based on the candidate values and a target training manner, wherein according to the target training manner, a modulus length of the weight parameter of the to-be-trained classification model before update is the same as a modulus length of an updated weight parameter of the to-be-trained classification model, and the performance parameter comprises precision of the to-be-trained classification model; and determining a target value of the target hyperparameter from the candidate values based on the performance parameter.

6. The search method according to claim 5, wherein precision of the to-be-trained classification model corresponding to the target value is greater than precision of the to-be-trained classification model corresponding to another candidate value in the candidate values.

7. The search method according to claim 5, wherein the obtaining candidate values of a target hyperparameter comprises:

evenly dividing an initial search range of the target hyperparameter to obtain the candidate values of the target hyperparameter.

8. The search method according to claim 7, further comprising:

updating the initial search range of the target hyperparameter based on a current quantity of training operations, a preconfigured quantity of training operations, and a change trend of precision of the to-be-trained classification model.

9. The search method according to claim 8, wherein the updating the initial search range of the target hyperparameter based on the current quantity of training operations, the preconfigured quantity of training operations, and the change trend of precision of the to-be-trained classification model comprises:

when the current quantity of training operations is less than the preconfigured quantity of training operations, updating an upper limit of the initial search range of the target hyperparameter to a candidate value of the target hyperparameter corresponding to optimal precision of the to-be-trained classification model in the current quantity of training operations.

10. The search method according to claim 8, wherein the updating the initial search range of the target hyperparameter based on the current quantity of training operations, the preconfigured quantity of training operations, and the change trend of precision of the to-be-trained classification model comprises:

when the current quantity of training operations is equal to the preconfigured quantity of training operations, updating an upper limit of the initial search range of the target hyperparameter to a first candidate value, and updating a lower limit of a search range of the target hyperparameter to a second candidate value, wherein the first candidate value and the second candidate value are candidate values adjacent to a candidate value of the target hyperparameter corresponding to optimal precision of the to-be-trained classification model.

11. The search method according to claim 5, wherein the scaling invariance linear layer obtains the predicted classification result according to the following formula:

$$Y_i = \frac{X^T W_i}{\|W_i\|} * S; \text{ and}$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

12. The search method according to claim 5, wherein the target training manner comprises:
processing the updated weight parameter according to the following formula, so that the modulus length of the weight parameter of the to-be-trained classification model before update i the same as the modulus length of the updated weight parameter of the to-be-trained classification model:

$$W_{i+1} = \frac{W_i}{\|W_i\|} * Norm_0; \text{ and}$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

13. A hyperparameter searching apparatus, comprising:
an interface configured to obtain candidate values of a target hyperparameter, wherein the target hyperparameter controls a gradient update operation of a to-be-trained classification model, the to-be-trained classification model comprises a scaling invariance linear layer, and the scaling invariance linear layer enables a predicted classification result output when a weight parameter of the to-be-trained classification model is multiplied by any scaling coefficient to remain unchanged; and
one or more processors configured to: obtain a performance parameter of the to-be-trained classification model based on the candidate values and a target training manner wherein according to the target training manner, a modulus length of the weight parameter of the to-be-trained classification model before update is the same as a modulus length of an updated weight parameter of the to-be-trained classification model, and the performance parameter comprises precision of the to-be-trained classification model; and determine a target value of the target hyperparameter from the candidate values based on the performance parameter.

14. The searching apparatus according to claim 13, wherein precision of the to-be-trained classification model corresponding to the target value is greater than precision of the to-be-trained classification model corresponding to another candidate value in the candidate values.

15. The searching apparatus according to claim 13, wherein the one or more processors are further configured to:
evenly divide an initial search range of the target hyperparameter to obtain the candidate values of the target hyperparameter.

16. The searching apparatus according to claim 15, wherein the one or more processors are is further configured to:
update the initial search range of the target hyperparameter based on a current quantity of training operations, a preconfigured quantity of training operations, and a change trend of precision of the to-be-trained classification model.

17. The searching apparatus according to claim 16, wherein the one or more processors are further configured to:
when the current quantity of training operations is less than the preconfigured quantity of training operations, update an upper limit of the initial search range of the target hyperparameter to a candidate value of the target hyperparameter corresponding to optimal precision of the to-be-trained classification model in the current quantity of training operations.

18. The searching apparatus according to claim 16, wherein the one or more processors are further configured to:
when the current quantity of training operations is equal to the preconfigured quantity of training operations, update an upper limit of the initial search range of the target hyperparameter to a first candidate value, and update a lower limit of a search range of the target hyperparameter to a second candidate value, wherein the first candidate value and the second candidate value are candidate values adjacent to a candidate value of the target hyperparameter corresponding to optimal precision of the to-be-trained classification model.

19. The searching apparatus according to claim 13, wherein the scaling invariance linear layer obtains the predicted classification result according to the following formula:

$$Y_i = \frac{X^T W_i}{\|W_i\|} * S; \text{ and}$$

$Y_i$ represents a predicted classification result corresponding to a weight parameter in an $i^{th}$ iterative update, $W_i$ represents the weight parameter in the $i^{th}$ iterative update, X represents a to-be-classified feature, and S represents a scale constant.

20. The searching apparatus according to claim 13, wherein the target training manner comprises the one or more processors configured to:
process the updated weight parameter according to the following formula, so that the modulus length of the weight parameter of the to-be-trained classification model before update is the same as the modulus length of the updated weight parameter of the to-be-trained classification model:

$$W_{i+1} = \frac{W_i}{\|W_i\|} * Norm_0; \text{ and}$$

$W_{i+1}$ represents a weight parameter in an $(i+1)^{th}$ iterative update, $W_i$ represents the weight parameter in the $i^{th}$ iterative update, and $Norm_0$ represents an initial weight modulus length of the to-be-trained classification model.

* * * * *